United States Patent
Xue et al.

(10) Patent No.: US 11,428,774 B2
(45) Date of Patent: Aug. 30, 2022

(54) METHOD AND DEVICE FOR ESTIMATING A TIME OF ARRIVAL OF A RADIO SIGNAL

(71) Applicant: HUAWEI TECHNOLOGIES CO., LTD., Shenzhen (CN)

(72) Inventors: Jiantao Xue, Beijing (CN); Yuan Gao, Shenzhen (CN); Jing Han, Beijing (CN); Xizeng Dai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 16/659,891

(22) Filed: Oct. 22, 2019

(65) Prior Publication Data

US 2020/0049791 A1 Feb. 13, 2020

Related U.S. Application Data

(63) Continuation of application No. PCT/CN2017/083806, filed on May 10, 2017.

(51) Int. Cl.
*G01S 5/02* (2010.01)
*G01S 5/06* (2006.01)
*G01S 3/00* (2006.01)

(52) U.S. Cl.
CPC ............. *G01S 5/0273* (2013.01); *G01S 5/06* (2013.01); *G01S 3/00* (2013.01)

(58) Field of Classification Search
CPC ............. G01S 5/0273; G01S 5/06; G01S 3/00
USPC .................................................. 342/417, 451
See application file for complete search history.

(56) References Cited

U.S. PATENT DOCUMENTS

| | | | | |
|---|---|---|---|---|
| 6,026,304 A | * | 2/2000 | Hilsenrath | H04L 67/16 455/456.2 |
| 6,249,680 B1 | * | 6/2001 | Wax | G01C 21/26 370/335 |
| 6,711,528 B2 | * | 3/2004 | Dishman | H04K 1/02 324/309 |
| 6,717,979 B2 | * | 4/2004 | Ribeiro Dias | G06K 9/0057 375/150 |
| 7,228,244 B2 | * | 6/2007 | Xin | G01S 3/74 702/150 |

(Continued)

FOREIGN PATENT DOCUMENTS

| | | |
|---|---|---|
| CN | 101315418 A | 12/2008 |
| CN | 101702827 A | 5/2010 |

(Continued)

OTHER PUBLICATIONS

Xinrong Li and K. Pahlavan, "Super-resolution TOA estimation with diversity for indoor geolocation," in IEEE Transactions on Wireless Communications, vol. 3, No. 1, pp. 224-234, Jan. 2004.*

(Continued)

*Primary Examiner* — Chuong P Nguyen
(74) *Attorney, Agent, or Firm* — Rimon PC

(57) ABSTRACT

A method and device for estimating the time of arrival (ToA) of a radio signal are proposed. The radio signal comprises M subsignals carried on M subcarriers, where M is an integer ≥2. The number of propagation paths and the time of arrival associated with a first path are estimated. The technique can improve ToA estimation accuracy, especially in a multipath fading channel, and reduce the need for channel information.

17 Claims, 3 Drawing Sheets

(56) References Cited

U.S. PATENT DOCUMENTS

| | | | |
|---|---|---|---|
| 7,263,083 B2* | 8/2007 | Kisigami | G01S 3/74 342/417 |
| 7,292,189 B2* | 11/2007 | Orr | G01S 5/0215 342/387 |
| 7,969,311 B2* | 6/2011 | Markhovsky | G01S 13/767 702/158 |
| 8,200,244 B2 | 6/2012 | Levin et al. | |
| 8,208,587 B2* | 6/2012 | Chong | H04L 25/0202 375/340 |
| 8,305,215 B2* | 11/2012 | Markhovsky | G01S 3/74 340/572.1 |
| 8,494,569 B2* | 7/2013 | Nielsen | H04B 7/084 455/504 |
| 8,648,722 B2* | 2/2014 | Markhovsky | G01S 3/74 340/572.1 |
| 9,288,623 B2* | 3/2016 | Markhovsky | G01S 5/0257 |
| 9,681,267 B2* | 6/2017 | Sommer | H04W 4/023 |
| 10,042,037 B2* | 8/2018 | Chrabieh | G01S 11/02 |
| 10,539,652 B2* | 1/2020 | Chrabieh | G01S 5/0221 |
| 2003/0054845 A1* | 3/2003 | Krasny | G01S 5/0215 455/506 |
| 2004/0008803 A1 | 1/2004 | Aldrovandi et al. | |
| 2010/0279707 A1 | 11/2010 | Fischer et al. | |
| 2016/0381504 A1* | 12/2016 | Sommer | H04W 4/023 455/456.1 |
| 2018/0081024 A1 | 3/2018 | Li et al. | |
| 2018/0313930 A1* | 11/2018 | Chrabieh | H04L 27/2628 |
| 2020/0103491 A1* | 4/2020 | Chrabieh | G01S 11/02 |
| 2020/0166631 A1* | 5/2020 | Tong | G01S 13/762 |

FOREIGN PATENT DOCUMENTS

| | | |
|---|---|---|
| CN | 102197315 A | 9/2011 |
| CN | 103634038 A | 3/2014 |
| CN | 105915473 A | 8/2016 |
| JP | 2014137241 A | 7/2014 |
| WO | 2005072000 A1 | 8/2005 |
| WO | 2016191941 A1 | 12/2016 |

OTHER PUBLICATIONS

Driusso Marco et al: "Vehicular Position Tracking Using LTE Signals", Apr. 1, 2017 (Apr. 1, 2017),pp. 3376-3391,XP011645879,total 16 pages.

Fang Zhao et al: "Super-resolution TOA Estimation in OFDM Systems for Indoor Environments ",Apr. 1, 2007 (Apr. 1, 2007), pp. 723-728,XP031178400,total 6 pages.

Vinay Uday Prabhu, et al., "An Improved ESPRIT Based Time-of-Arrival Estimation Algorithm for Vehicular OFDM Systems," VTC Spring 2009—IEEE 69th Vehicular Technology Conference, 1-4, Apr. 29, 2009, pp. 1-4.

Huawei Technologies Co., Ltd., et al., "Nb M2M—Performance of Uplink Timing," 3GPP TSG GERAN 1 Adhoc#2 on FS_IoT_LC, GPC150169, Sophia-Antipolis, France, Agenda Item: 1.4.2.3, Apr. 20, 2015, pp. 1-3.

J r me Soubielle et al., GPS Positioning in a Multipath Environment. IEEE Transactions On Signal Processing, vol. 50, No. 1, Jan. 2002, 10 pages.

Li Jing et al., Super-resolution TOA algorithm in multi-path environments. Chinese Journal of Radio Science, vol. 21, No. 5, Oct. 2006, 6 pages.

* cited by examiner

METHOD AND DEVICE FOR ESTIMATING A TIME OF ARRIVAL OF A RADIO SIGNAL

CROSS-REFERENCE TO RELATED DISCLOSURES

This application is a continuation of International Application No. PCT/CN2017/083806, filed on May 10, 2017. The content of the aforementioned application is hereby incorporated by reference in its entirety.

TECHNICAL FIELD

The present disclosure generally relates to communication technologies, and more specifically to a method and a device for estimating a time of arrival (ToA) of a radio signal in a wireless network.

BACKGROUND

Ever increasing Location Services (LCS) demand more accurate positioning techniques. Positioning mechanisms were specified in 3GPP as a key feature for Universal Terrestrial Radio Access (UTRA) and Evolved-Universal Terrestrial Radio Access (E-UTRA) networks since Release-99 and Release-9, respectively, e.g., Assisted Global Navigation Satellite System (A-GNSS), Observed Time Difference of Arrival (OTDOA), and Uplink Time Difference of Arrival (UTDOA). In addition to commercial applications, enhancements to the US FCC Enhanced 911 requirements also focus on improving accuracy for positioning.

Time of arrival (ToA) is the time at which a radio signal (emitted from a transmitter, e.g., from a base station or from an Evolved Node B (eNodeB or eNB) arrives at a receiver (e.g., at user equipment (UE)). The ToA can be used to determine the distance between the transmitter and the receiver (e.g., the distance between eNB and UE). For example, a UE can receive radio signals from several eNBs and estimate the ToA for each of these signals. The position of the UE can then be determined based on the set of estimated ToAs. The accuracy of ToA estimation determines the accuracy of the UE's position. In practice, a multipath environment can heavily degrade ToA estimation.

One method for estimating ToA involves a matched filter technique. Such method is widely used in radar systems and UE chipsets. A received reference signal is compared (e.g., correlated) against a reference signal generated within the receiver. Since the reference signal generated locally is similar to the received reference signal (ideally, they are identical), the time correlation of these two signals has a peak at the time of arrival. Thus, the ToA can be estimated as the occurring time of the maximum peak on the correlation map.

In an Additive White Gaussian Noise (AWGN) channel, the match filter ToA estimation method can achieve relatively high accuracy. However, in practice, multipath fading will often contaminate the correlation figure. The time resolution of the matched filter method tends to depend quite heavily on the signal bandwidth. If the time resolution is lower than the delay between the peaks from different propagation paths, it can be hard to distinguish the ToA of the shortest path. Large bandwidth tends to reduce spectral efficiency. Matched filter ToA estimation therefore tends to give rather poor results.

Another method for improving matched filter ToA estimation differs from the above mentioned method in that the earliest time at which the correlation between the received signal and the reference signal exceeds a threshold, rather the maximum peak, is chosen as the ToA. The threshold can be set based on experience. A disadvantage of the improved method is the need for pre-knowledge of the channel information. In practice, it may be not sufficiently robust. The threshold may also be set based on a spectrum measurement campaign for a given area. However, the robustness of the algorithm is poor. In a different area, the threshold may no longer be valid and the performance will be degraded.

SUMMARY

It is an object of the present patent disclosure to provide a method and a device for estimating ToA. In particular, it is an object of the present disclosure to improve the accuracy of ToA estimation.

In a first aspect, the present disclosure provides a method for estimating a time of arrival of a radio signal at a wireless communication device, wherein the radio signal comprises M subcarriers, wherein M≥2 and wherein the method comprises: receiving the radio signal by the wireless communication device; obtaining, by the wireless communication device, M subsignals from the M subcarriers, by demodulating each of the M subcarriers to obtain a respective one of the M subsignals; determining an autocorrelation matrix P of the subsignals; estimating a number of propagation paths based on the eigenvalues and eigenvectors of the autocorrelation matrix; and estimating a time of arrival associated with a first path based on the eigenvalues and eigenvectors of the autocorrelation matrix and the estimated number of propagation paths.

The first aspect of the present disclosure can make ToA estimation more accurate, especially when applied to a multipath fading channel. Furthermore, it can reduce the need for pre-knowledge of the channel information for robustness.

According to a first implementation of the method according to the first aspect, the determining of the autocorrelation matrix comprises: normalizing the subsignals, and calculating the autocorrelation matrix based on the normalized subsignals.

According to a second implementation of the method according to the first aspect, the estimating of the number of propagation paths comprises finding an integer value m∈{1, 2, . . . , $N_P$} that minimizes the function $$MDL(m) = -(N_P - m)L\log\left(\frac{\prod_{i=m+1}^{N_P} \lambda_i^{\frac{1}{N_P-m}}}{\frac{1}{N_P - m}\sum_{i=m+1}^{N_P} \lambda_i}\right) + \frac{1}{2}m(2N_P - m)\log L,$$

wherein $N_P \in \{2, 3, \ldots, M\}$ is an upper boundary of the multipath searching range $\{1, 2, \ldots, N_P\}$; and $\lambda_i$ are eigenvalues of autocorrelation matrix P.

According to a third implementation of the method according to the first aspect, the determining of the autocorrelation matrix P comprises calculating P as follows:

$$P = \frac{1}{L}\sum_{l=1}^{L} R'(l)R'^H(l),$$

wherein R'(l) is an l-th component of a subcarrier symbol vector.

According to a fourth implementation of the method according to the first aspect, the estimating of the time of arrival associated with the first path comprises:

$$Q(t) = \frac{1}{\phi^H(t) G G^H \phi(t)},$$

wherein t is the time of arrival of the first path corresponding to a maximum of the estimator, and $0 \leq t \leq N_w$; where $N_w$ is a searching window size; and wherein $\phi(t)$ is a set of subcarriers.

According to a fifth implementation of the method according to the first aspect, the wireless communication device is a network device or a terminal device.

In a second aspect, the present disclosure provides a wireless communication device for estimating a time of arrival of a radio signal. The wireless communication device comprises units for performing the method of the first aspect.

In a third aspect, the present disclosure provides a computer-readable storage medium comprising instructions that, when executed by a computer, cause the computer to carry out the method of the first aspect.

The method of the present disclosure can have high time resolution. The obtained peak will likely be narrower, thus the multipath contributions are easier to distinguish. The proposed solution can therefore perform better, particularly in a multipath environment.

BRIEF DESCRIPTION OF THE DRAWINGS

Preferred features of the present disclosure will now be described, by way of non-limiting embodiments, with reference to the accompanying drawings.

Figure 1:
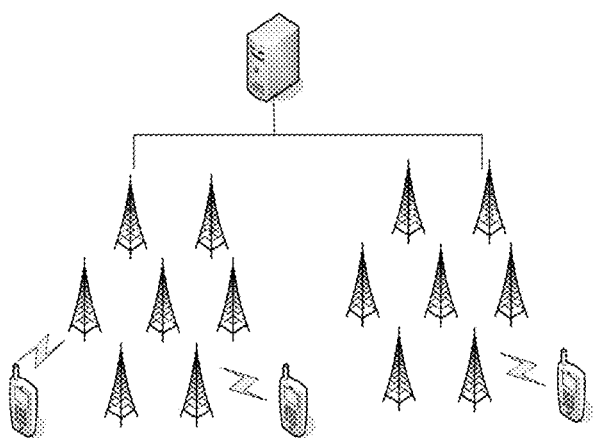
FIG. 1 is a simplified block diagram of an example of a wireless communication architecture in accordance with an embodiment of the disclosure.

Throughout the drawings, identical reference characters and descriptions indicate elements with the same or equivalent functions, but are not necessarily identical. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

In order to make the aforementioned objectives, technical solutions and advantages of the present disclosure more comprehensible, a detailed description is provided below.

The detailed description sets forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively by a wide range of hardware, software, firmware, or virtually any combination thereof.

FIG. 1 illustrates an example of a wireless communication system (also referred to herein as "the system"). The system may comprise a plurality of network devices (for example, base stations and access points), terminal devices (for example, mobile stations, user equipment, user devices, etc.), and core network (CN) devices (for example, MME, S-GW, GGSN, etc.)

Some legacy solutions (e.g., match filter techniques) have poor time resolution due to a discrete sampling rate and limited bandwidth (resulting in wide peaks thus making it difficult to distinguish the peaks of the various propagation paths in a multipath environment). As a result, the time resolution is limited and multipath peaks are not easy to distinguish.

Figure 2:
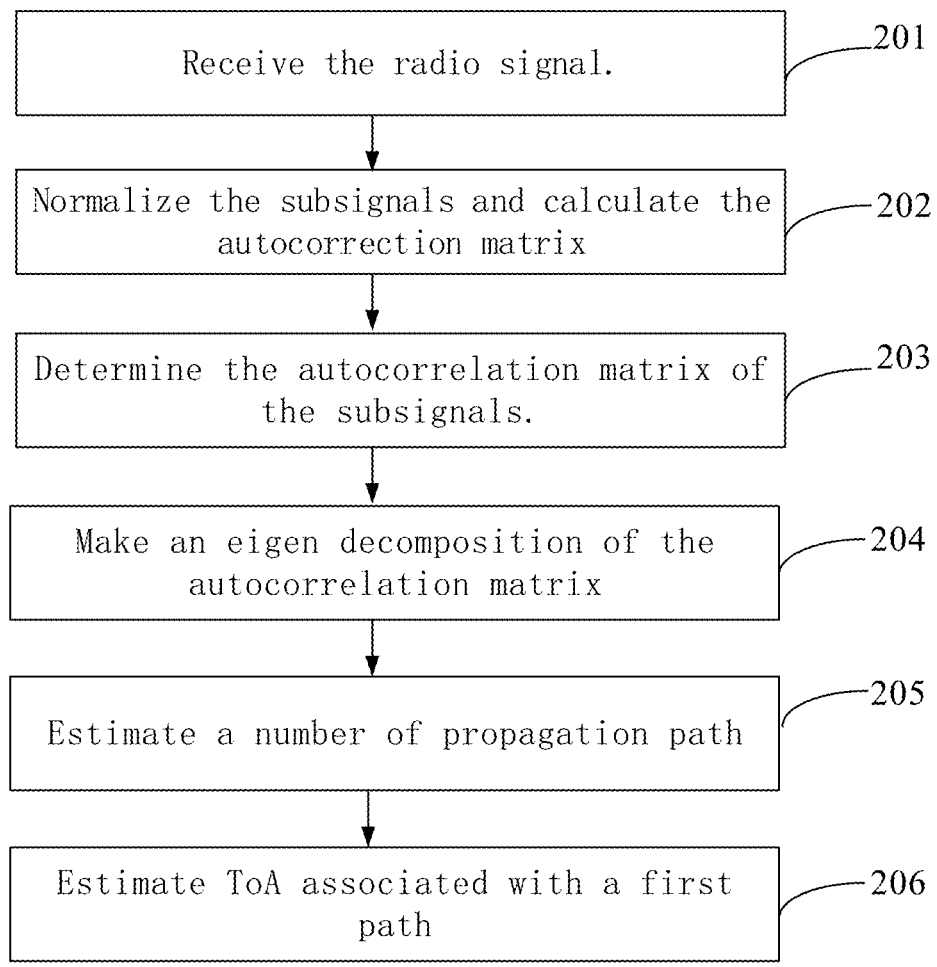
FIG. 2 is a flow chart of a method for estimating ToA in accordance with an embodiment of the disclosure.

Based on the technical solution mentioned above, an aspect of the present disclosure provides a method for estimating a time of arrival of a radio signal at a wireless communication device, as illustrated in FIG. 2. One example of the method comprises:

Step 201: a wireless communication device receives a radio signal. The radio signal includes M subsignals and each of the M subsignals includes a sequence of L symbols. The wireless communication device may be a network device (e.g., a base station or an eNodeB) or a terminal device (e.g., a base station).

For example, the radio signal comprises M subsignals carried on M subcarriers, each of the M subcarriers carrying one of the subsignals, wherein $M \geq 2$.

More particularly, using LTE as an example, for every Orthogonal Frequency Division Multiplexing (OFDM) symbol, the transmitted Positioning Reference Signal (PRS) can be expressed as:

$$s[n] = \sqrt{\frac{1}{N}} \sum_{k \in N_a} S_k \exp\left(j \frac{2 k n \pi}{N}\right), \quad n = 0, 1, \ldots, N-1 \quad (1)$$

wherein N is the FFT size, k is a subcarrier frequency, $S_k$ is a signal symbol carried on the subcarrier, $N_a$ is a set of discrete frequencies of subcarriers.

For every OFDM symbol, after demodulating to baseband, sampling and removing cyclic prefix (CP), the received PRS can be expressed as:

$$r[n] = \sqrt{\frac{1}{N}} \sum_{k \in N_a} R_k \exp\left(j \frac{2 k n \pi}{N}\right), \quad n = 0, 1, \ldots N-1, \quad (2)$$

wherein N is the FFT size, k is a subcarrier frequency, $R_k$ is a symbol on the subcarrier k. $N_a$ is a set of discrete frequencies of subcarriers. $R_k$ can be calculated, for example, by using a Fourier method.

In addition, a plurality of OFDM symbols can be combined during measuring time to obtain an average of the received signal symbol on every subcarriers $R_k$, if the channel remains sufficiently stable. There are many methods for extracting signal symbols from the various subcarriers. Most of them are prior art and need not be described here.

Optionally, before Step 201, there is a Step 201a. Step 201a is: preprocessing the PRS.

The operations of preprocessing may comprise, for example, calculating a correction for Doppler frequency offset, center frequency offset, phase offset and receiving power error, etc.

In optional Step 202, the wireless communication device (or another device, e.g., a network device connected to the wireless communication device) normalizes the subsignals and calculates the autocorrelation matrix based on the normalized subsignals.

The operation of normalization can make the amplitude of an input signal not too large in subsequent calculation, to reduce the storage space of a register and to reduce the use of computational resources.

Because of the received PRS is known, the normalized signal received on subcarrier k can be expressed as:

$$R'_k = \frac{R_k}{S_k}, \quad k \in N_a, \qquad (3)$$

wherein $R_k$ is a symbol on the subcarrier k, and $S_k$ is a signal symbol bearing on the subcarrier. The affection from the channel to the sending signal can be seen better after the operation of normalization. $N_a$ is a set of discrete frequencies of subcarriers.

In Step 203, the wireless communication device or the other device determines the autocorrelation matrix P of the subsignals.

Based on equation (3), a normalized symbol vector R' can be expressed as:

$$R' = (R'_{k_1}, R'_{k_2}, \ldots, R'_{k_M})^T, \qquad (4)$$

wherein M is a number of the set of $N_a$; $(k_1, k_2, \ldots, k_M)$ are arbitrary array configurations of the set $N_a$, which can constitute a set of symbols of the received signals on subcarriers of the PRS.

A set of L successive normalized symbol vectors R'(l) (l=1, . . . , L) can be obtained by collecting L successive normalized symbol vectors R', wherein L is a natural number. Choosing L greater than one can make the method more robust.

The autocorrelation matrix can then be calculated as:

$$P = \frac{1}{L} \sum_{l=1}^{L} R'(l) R'^H(l). \qquad (5)$$

If Step 202 is omitted, R'(l) is the l-th subcarrier symbol vector of a set of L successive (non-normalized) received signal vectors. Then P is an average of L autocorrelation matrices that can be associated with a sequence of L OFDM symbols (there being one autocorrelation matrix per symbol). If the received signal uses only one (e.g., the l-th) OFDM symbol to estimate the correlation matrix P in a period of time, L=1. Based on an equation (5), the autocorrelation matrix of each subcarrier symbol on one OFDM symbol can be expressed as:

$$P = R' R'^H \qquad (6)$$

In Step 204, the wireless communication device or the other device makes an eigen decomposition of the autocorrelation matrix.

Thus a diagonal matrix Λ (consisting of eigenvalues of the autocorrelation matrix P) and an orthogonal matrix U (consisting of eigenvectors of the autocorrelation matrix P) can be obtained so that $$P = U \Lambda U^{-1} \qquad (7)$$

where $$\Lambda = \text{diag}(\lambda_1, \lambda_2, \ldots, \lambda_M), \quad \lambda_1 \geq \lambda_2 \geq \ldots \lambda_M \qquad (8)$$

And λ are the eigenvalues of P; M is a number of the set of $N_a$; the orthogonal matrix U is a matrix consisting of eigenvectors $u_1, u_2, \ldots, u_M$ corresponding to the eigenvalues.

Optionally, an existing algorithm, such as Cholesky or QZ algorithm, can be used for making the eigen decomposition according to equation (7).

In Step 205, the wireless communication device or the other device estimates a number of propagation paths based on the eigenvalues and eigenvectors of the autocorrelation matrix.

For example, the multipath searching range may be Np, wherein Np is an integer value that is greater than the real number of propagation paths and smaller than M. For example, the number of propagation paths can be estimated as:

$$MDL(m) = -(N_p - m) L \log \left( \frac{\prod_{i=m+1}^{N_p} \lambda_i^{\frac{1}{N_p - m}}}{\frac{1}{N_p - m} \sum_{i=m+1}^{N_p} \lambda_i} \right) + \frac{1}{2} m (2 N_p - m) \log L, \qquad (9)$$

wherein m=1, 2, . . . , $N_P$ and the definition of λ and L is same as previously mentioned.

When m takes different values, different values of MDL (m) can be obtained. When the value of MDL(m) is minimum, the corresponding value of m is the estimated number D of propagation paths.

There are many existing algorithms that can be used to estimate the number of propagation paths, for example, Blind Source Separation/Blind Signal Separation (BBS), or Independent Component Analysis (ICA). These are not described here.

In Step 206, the wireless communication device or the other device estimates the ToA associated with a first path based on the eigenvalues and eigenvectors of the autocorrelation matrix and the estimated number of propagation paths.

Based on the calculating result of Equation (9), a noise subspace is defined as:

$$G = (u_{D+1}, u_{D+2}, \ldots, u_M) \qquad (10)$$

wherein $U_{D+1}$ is an eigenvector corresponding to the (D+1)-th eigenvalue according to equation (7). A signal subspace is spanned by the eigenvectors corresponding to the greatest eigenvalues 1 to D; and the noise subspace is the other eigenvector corresponding to the eigenvalue. $N_w$ is a searching window size. $N_w$ is a real number that can be larger than the arrival time of the last propagation path and smaller than N. An estimator Q(t) can be constructed in order to estimate ToA, for example as follows:

$$Q(t) = \frac{1}{\phi^H(t) G G^H \phi(t)}, \quad 0 \le t \le N_w, \quad (11)$$

where a set of subcarriers ϕ(t) can be expressed as:

$$\phi(t) = \left( e^{-j\frac{2\pi}{N} k_1 t}, e^{-j\frac{2\pi}{N} k_2 t}, \ldots, e^{-j\frac{2\pi}{N} k_M t} \right)^T. \quad (12)$$

In the equation (11), only t is a variable, the other parameters are constant. When t takes different values, the value of Q(t) will generally be different. If the equation (11) takes a maximum, the corresponding t is a potential ToA (i.e. a candidate value for ToA).

In order to determine the ToA associated with the first path, the maxima of Q(t) can be found as follows:

First, all of the maxima of equation (11) can be calculated; t corresponding to the largest D maxima are the times of arrival (ToAs) corresponding to every propagation path. If the number of maxima is more than D, the D values of t corresponding to the largest D maxima are selected as ToAs associated with the first path. If there are less then D maxima, the ToA is the first element of maxima's timing. A unit of t is a sampling number and a unit of ToA is a period associated with the sampling number. The unit of ToA can be changed from the sampling number to one second (1 s).

This step can use another algorithm to estimate ToA, for example, an algorithm of multiple signal classification (MUSIC), an algorithm of timer-reversal MUSIC (TR-MUSIC), an algorithm of minimum variance distortionless response (MVDR), an algorithm of Wavelet, etc.

The method of the present disclosure has superior time resolution, because it takes into consideration of the phase information between subcarriers. The time resolution can, in principle, achieve an arbitrary level. The peak of Q(t) is narrower, making the multiple paths easier to distinguish. Thus the proposed solution works better, especially in a multipath environment.

Figure 3:
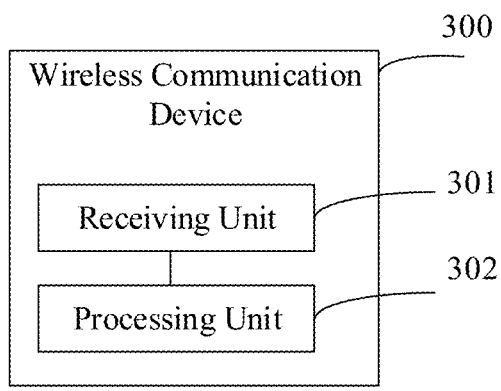
FIG. 3 is a simplified block diagram of a wireless communication device in accordance with an embodiment of the disclosure.

As illustrated in FIG. 3, the present disclosure provides a wireless communication device 300, which comprises:

a receiving unit 301 for receiving a sequence of L symbols of each of the M subsignals in a radio signal;

a processing unit 302 for determining an autocorrelation matrix P of the subsignals; estimating a number of propagation paths based on the eigenvalues and eigenvectors of the autocorrelation matrix; and estimating a time of arrival associated with a first path based on the eigenvalues and eigenvectors of the autocorrelation matrix and the estimated number of propagation paths.

The receiving unit 301 and the processing unit 302 perform the corresponding function of the method as previous mentioned and need not be repeated here.

The wireless communication device can be a network device or a terminal device.

According to an embodiment of the present disclosure, the processing unit for determining the autocorrelation matrix comprises normalizing the subsignals and calculating the autocorrelation matrix based on the normalized subsignals.

Optionally, the processing unit for estimating the number of propagation paths comprises finding an integer value m∈{1, 2, . . . , $N_P$} that minimizes Equation (9).

Optionally, the processing unit for determining the autocorrelation matrix P comprises calculating P as Equation (5).

Optionally, the processing unit is configured to estimate the time of arrival associated with the first path using the equation (11).

Figure 4:
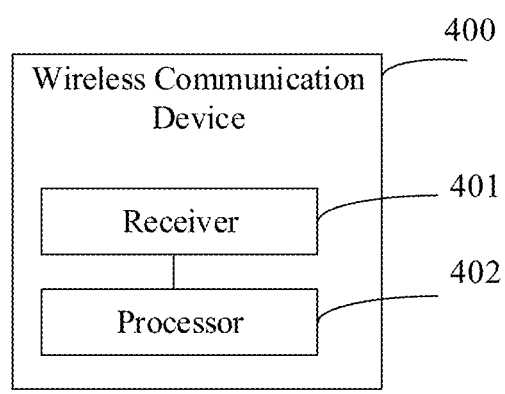
FIG. 4 is a simplified block diagram of a wireless communication device in accordance with an embodiment of the disclosure.

It is noted that the wireless communication device 300 can perform any function as the wireless communication device of the previous method. The receiving unit 301 can perform any receiving function of the wireless communication device as the previous method of the present disclosure. The processing unit 302 can perform any function of obtaining, determining, calculating, estimating, etc. as the previous method of the present disclosure. In physical realization, the receiving unit 301 can be a receiver, a transceiver, etc. the processing unit 302 can be a processer, controller, CPU, etc. As illustrated in FIG. 4, the wireless communication 400 comprises a processor 402 and a receiver 401. They are connected with each other by different electrical circuit interface (for example, bus).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed.

Persons of ordinary skill in the art should understand that all or part of the subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and disclosure specific integrated circuits. In addition, a computer readable medium that implements the subject matter described herein may be located on a single device or computing platform or may be distributed across multiple devices or computing platforms.

Finally, it should be understood that the above embodiments are only used to explain, but not to limit the technical solution of the present disclosure. Despite the detailed description of the present disclosure with reference to above preferred embodiments, it should be understood that various modifications, changes or equivalent replacements can be made by those skilled in the art without departing from the scope of the present disclosure and covered in the claims of the present disclosure.

What is claimed is:

1. A method for estimating a time of arrival of a radio signal at a wireless communication device, wherein the radio signal comprises M subcarriers, wherein M≥2, and wherein the method comprises:

receiving the radio signal by the wireless communication device;

obtaining, by the wireless communication device, M subsignals from the M subcarriers, by demodulating each of the M subcarriers to obtain a respective one of the M subsignals;

determining an autocorrelation matrix P of the M sub signals;

estimating a number of propagation paths based on the eigenvalues and eigenvectors of the autocorrelation matrix; and estimating a time of arrival of the radio signal associated with a first path based on the eigenvalues and eigenvectors of the autocorrelation matrix and the estimated number of propagation paths.

2. The method according to claim 1, wherein the determining of the autocorrelation matrix P comprises:

normalizing the subsignals, and calculating the autocorrelation matrix based on the normalized subsignals.

3. The method according to claim 1, wherein the estimating of the number of propagation paths comprises finding an integer value $m \in \{1, 2, \ldots, N_P\}$ that minimizes the function $$MDL(m) = -(N_p - m)L\log\left(\frac{\prod_{i=m+1}^{N_P} \lambda_i^{\frac{1}{N_p-m}}}{\frac{1}{N_p - m}\sum_{i=m+1}^{N_P} \lambda_i}\right) + \frac{1}{2}m(2N_P - m)\log L,$$

wherein $N_P \in \{2, 3, \ldots, M\}$ is an upper boundary of the multipath searching range $\{1, 2, \ldots, N_P\}$; and $\lambda_i$ are eigenvalues of autocorrelation matrix P.

4. The method according to claim 3, wherein the estimating of the time of arrival associated with the first path comprises evaluating Q(t) as follows:

$$Q(t) = \frac{1}{\phi^H(t)GG^H\phi(t)},$$

wherein t is the time of arrival of the first path corresponding to a maximum of Q(t), and $0 \leq t \leq N_w$; where $N_w$ is a searching window size.

5. The method according to claim 1, further comprising generating M symbol sequences by extracting, from each of the M subsignals, L consecutive symbols, the L extracted consecutive symbols forming a respective one of the M symbol sequences.

6. The method according to claim 5, wherein the determining of the autocorrelation matrix P comprises calculating the autocorrelation matrix P based on the M symbol sequences.

7. The method according to claim 5, wherein the determining of the autocorrelation matrix P comprises calculating P as follows:

$$P = \frac{1}{L}\sum_{l=1}^{L} R'(l)R'^H(l),$$

wherein R'(l) is an l-th normalized symbol vector.

8. The method according to claim 1, wherein the wireless communication device is a network device or a terminal device.

9. A wireless communication device for estimating a time of arrival of a radio signal, wherein the radio signal comprises M subsignals carried on M subcarriers, each of the M subcarriers carrying one of the subsignals, wherein M≥2 and wherein the device comprises:

a transceiver for receiving the radio signal;

a processor; and a computer-readable storage medium storing a program to be executed by the processor, the program including instructions that, when executed by the processor, cause the processor to:

obtain M subsignals from the M subcarriers, by demodulating each of the M subcarriers to obtain a respective one of the M subsignals;

determine an autocorrelation matrix P of the M sub signals;

estimate a number of propagation paths based on the eigenvalues and eigenvectors of the autocorrelation matrix; and estimate a time of arrival associated with a first path based on the eigenvalues and eigenvectors of the autocorrelation matrix and the estimated number of propagation paths.

10. The wireless communication device according to claim 9, wherein the instructions further cause the processor to:

normalize the subsignals and calculate the autocorrelation matrix based on the normalized subsignals.

11. The wireless communication device according to claim 9, wherein the instructions further cause the processor to:

estimate the number of propagation paths by finding an integer value $m \in \{1, 2, \ldots, N_P\}$ that minimizes the function $$MDL(m) = -(N_p - m)L\log\left(\frac{\prod_{i=m+1}^{N_P} \lambda_i^{\frac{1}{N_p-m}}}{\frac{1}{N_p - m}\sum_{i=m+1}^{N_P} \lambda_i}\right) + \frac{1}{2}m(2N_P - m)\log L,$$

wherein $N_P \in \{2, 3, \ldots, M\}$ is an upper boundary of the multipath searching range $\{1, 2, \ldots, N_P\}$; and $\lambda_i$ are eigenvalues of autocorrelation matrix P.

12. The wireless communication device according to claim 11, wherein the estimating of the time of arrival associated with the first path comprises evaluating Q(t) as follows:

$$Q(t) = \frac{1}{\phi^H(t)GG^H\phi(t)},$$

wherein t is the time of arrival of the first path corresponding to a maximum of Q(t), and $0 \leq t \leq N_w$; where $N_w$ is a searching window size.

13. The wireless communication device according to claim 9, wherein the instructions further cause the processor to:

generate M symbol sequences by extracting, from each of the M subsignals, L consecutive symbols, the L extracted consecutive symbols forming a respective one of the M symbol sequences.

14. The wireless communication device according to claim 13, wherein the instructions further cause the processor to determine the autocorrelation matrix P by calculating the autocorrelation matrix P based on the M symbol sequences.

15. The wireless communication device according to claim 13, wherein the instructions further cause the processor to determine the autocorrelation matrix P by calculating P as follows:

$$P = \frac{1}{L}\sum_{l=1}^{L} R'(l)R'^{H}(l),$$

wherein R'(l) is an l-th normalized symbol vector.

16. The wireless communication device according to claim 9, wherein the wireless communication device is a network device or a terminal device.

17. A non-transitory computer-readable storage medium comprising instructions that, when executed by a computer, cause the computer to carry out the method of claim 1.

\* \* \* \* \*

UNITED STATES PATENT AND TRADEMARK OFFICE
CERTIFICATE OF CORRECTION

| | |
|---|---|
| PATENT NO. | : 11,428,774 B2 |
| APPLICATION NO. | : 16/659891 |
| DATED | : August 30, 2022 |
| INVENTOR(S) | : Jiantao Xue et al. |

It is certified that error appears in the above-identified patent and that said Letters Patent is hereby corrected as shown below:

In the Claims

In Column 9, Lines 7-8, in Claim 1, delete "sub signals;" and insert -- subsignals; --.

In Column 10, Lines 16-17, in Claim 9, delete "sub signals;" and insert -- subsignals; --.

Signed and Sealed this
Fifteenth Day of November, 2022

*Katherine Kelly Vidal*

Katherine Kelly Vidal
*Director of the United States Patent and Trademark Office*